(12) United States Patent
Beutnagel-Buchner et al.

(10) Patent No.: US 7,679,495 B2
(45) Date of Patent: Mar. 16, 2010

(54) DISPLAYING UNIT AND METHOD FOR DISPLAYING A STEERING-WHEEL ANGLE, TO BE MODIFIED, OF A MOTOR VEHICLE

(75) Inventors: Uwe Beutnagel-Buchner, Stuttgart (DE); Petko Faber, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 513 days.

(21) Appl. No.: 10/559,172

(22) PCT Filed: May 21, 2004

(86) PCT No.: PCT/EP2004/050882

§ 371 (c)(1),
(2), (4) Date: Dec. 1, 2005

(87) PCT Pub. No.: WO2004/106145

PCT Pub. Date: Dec. 9, 2004

(65) Prior Publication Data

US 2008/0211651 A1 Sep. 4, 2008

(30) Foreign Application Priority Data

Jun. 2, 2003 (DE) ................... 103 24 812

(51) Int. Cl.
*B60Q 1/00* (2006.01)
(52) U.S. Cl. ............... 340/435; 116/31; 345/11
(58) Field of Classification Search ........... 340/435; 345/11; 116/31
See application file for complete search history.

(56) References Cited

U.S. PATENT DOCUMENTS

| | | | | |
|---|---|---|---|---|
| 4,743,883 A * | 5/1988 | Yoshimi et al. | ............. | 340/457 |
| 4,931,930 A * | 6/1990 | Shyu et al. | ............. | 701/36 |
| 6,988,570 B2 * | 1/2006 | Takeuchi | ............. | 180/6.48 |
| 7,002,458 B2 * | 2/2006 | Su | ............. | 340/465 |
| 7,024,286 B2 * | 4/2006 | Kimura et al. | ............. | 701/1 |
| 7,159,454 B2 * | 1/2007 | Tatraux-Paro et al. | ......... | 73/146 |
| 7,269,482 B1 * | 9/2007 | Shultz et al. | .............. | 701/1 |
| 7,379,225 B2 * | 5/2008 | Tonar et al. | ............. | 359/267 |
| 2002/0128754 A1 * | 9/2002 | Sakiyama et al. | ............. | 701/1 |
| 2006/0139181 A1 * | 6/2006 | Danz et al. | ............. | 340/932.2 |
| 2008/0077294 A1 * | 3/2008 | Danz et al. | ............. | 701/41 |
| 2008/0211651 A1 * | 9/2008 | Beutnagel-Buchner et al. | ... | 340/459 |

FOREIGN PATENT DOCUMENTS

| | | |
|---|---|---|
| DE | 27 04 519 | 7/1978 |
| DE | 198 54 206 | 5/2000 |
| DE | 10065230 A1 * | 7/2002 |
| EP | 1 087 360 | 3/2000 |
| EP | 1087360 A2 * | 3/2001 |
| FR | 2 685 275 | 6/1993 |
| FR | 2829072 A1 * | 3/2003 |
| JP | 63291200 | 11/1988 |

(Continued)

*Primary Examiner*—Daniel Wu
*Assistant Examiner*—Bradley E Thompson
(74) *Attorney, Agent, or Firm*—Kenyon & Kenyon LLP

(57) ABSTRACT

A display unit for representing a steering-wheel angle, to be modified, of a vehicle is provided, which has a multitude of adjacently arranged indicator elements. One or more of these indicator element(s) is/are illuminated to indicate a modification in the steering-wheel angle and possibly the steering direction.

19 Claims, 4 Drawing Sheets

FOREIGN PATENT DOCUMENTS

| | | |
|---|---|---|
| JP | 1151000 | 6/1989 |
| JP | 07 069236 | 3/1995 |
| JP | 2000335342 | 12/2000 |
| JP | 2002234459 A * | 8/2002 |
| JP | 2004025942 | 1/2004 |

* cited by examiner

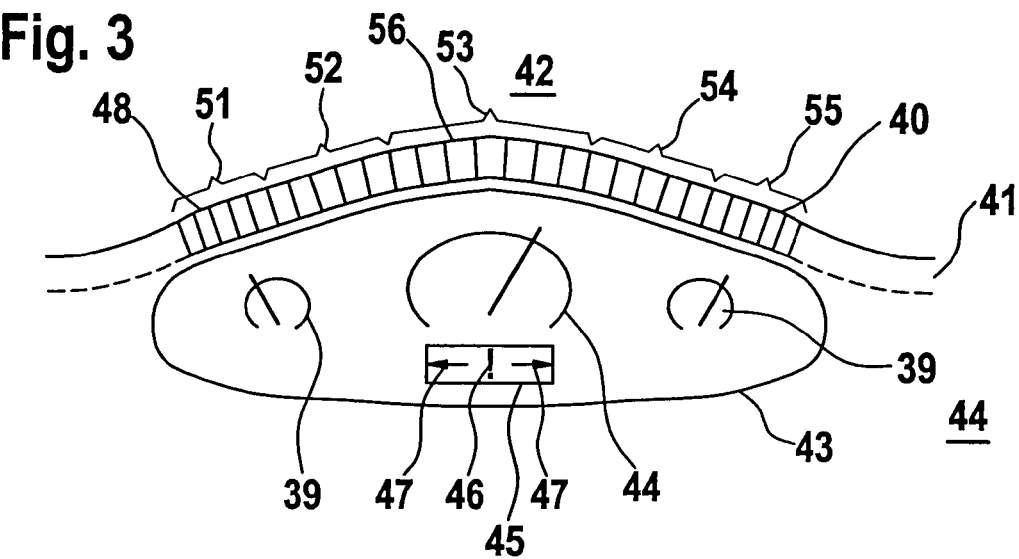
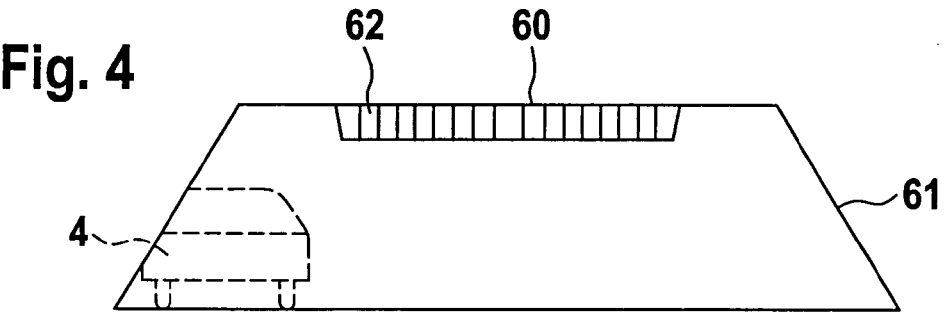
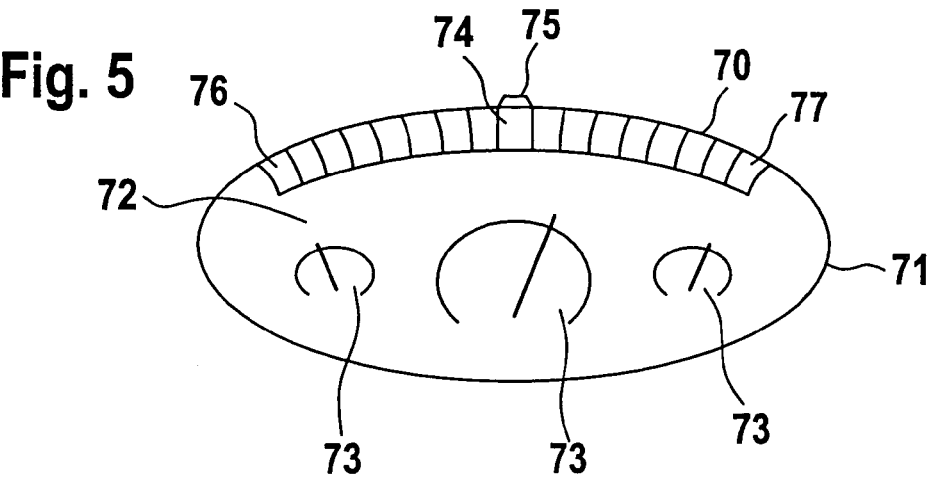

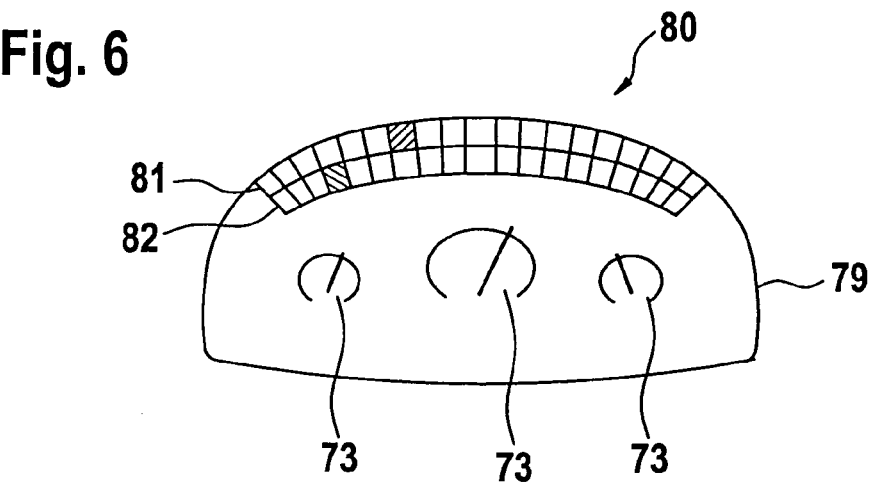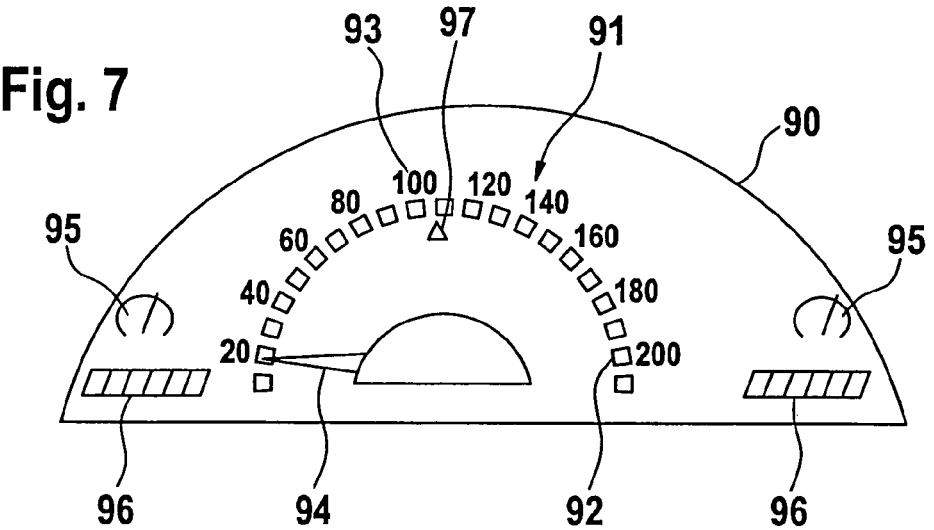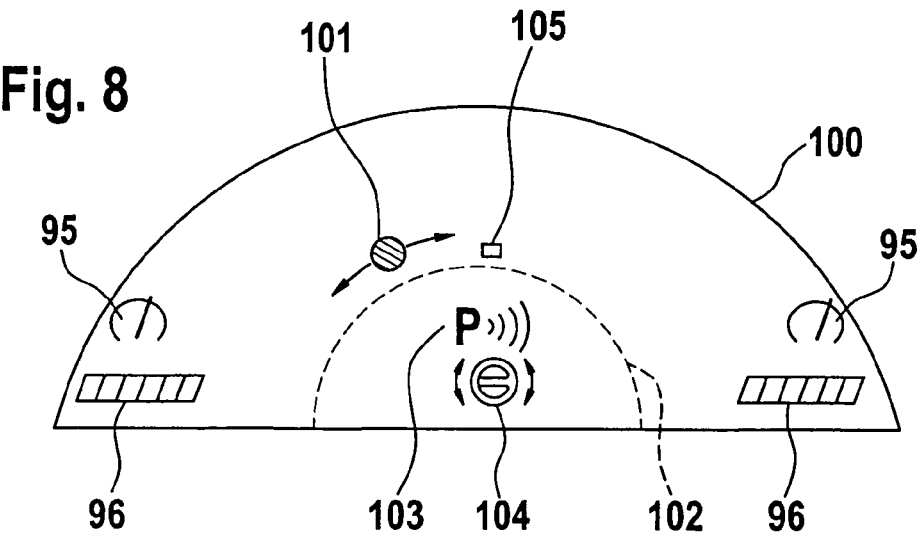

DISPLAYING UNIT AND METHOD FOR DISPLAYING A STEERING-WHEEL ANGLE, TO BE MODIFIED, OF A MOTOR VEHICLE

FIELD OF THE INVENTION

The invention is based on a display unit and a method for displaying a steering-wheel angle, to be modified, of a motor vehicle.

DESCRIPTION OF RELATED ART

Distance warning devices in motor vehicles which output a warning when a vehicle approaches an obstacle are not new. These distance warning devices are used as parking aids, in particular, where they are useful to a driver especially under tight parking conditions and poor visibility, when the driver is unable to estimate the vehicle boundaries or cannot make out the obstacle. Furthermore, systems are known that measure a parking space while passing it and subsequently steer the vehicle into the parking space by action on the drive train. Since such methods are relatively involved, output means that merely output driving instructions to a driver are known as well. For instance, it is known to indicate to a driver whether to drive forward, backward or stop. In the process, the driver is able to regulate the vehicle speed very precisely by controlling the pedals. Such a regulated control is more difficult when the steering wheel is angled since the driving speed, steering speed and instantaneous steering-wheel angle must be taken into account. While a driver is able to detect the vehicle speed himself and react accordingly, it is impossible for him to determine the instantaneous steering-wheel angle on his own, so that an implementation of an instruction to a driver that is output in spoken form, for instance, is difficult as well. For the purpose of parking, a driver must therefore generally execute a full turn of the steering wheel in a predefined direction while at a standstill, drive until reaching a turning point where the driver is then instructed to fully turn the steering wheel into the completely opposite direction. Because of this full turning of the steering wheel, parking is time-consuming and the tires are subjected to additional stress by the maximum steering angle while at a standstill.

SUMMARY OF THE INVENTION

In accordance with invention, a display unit is provided having a plurality of adjacently arranged display elements to display a steering-wheel angle, to be modified, of the vehicle. These display elements are controllable in such a way that they are able to be illuminated as a function of the steering-wheel angle to be modified in order to indicate to the driver the steering direction to be adjusted. This makes it easy for the driver to understand whether a correction of the steering-wheel angle will be required or whether the vehicle is driving in the right direction.

It is particularly advantageous to select only one display element or a group of display elements for an illumination as a function of the extent to which the steering direction needs to be changed. In this simple manner, a driver thus obtains information as to how heavily or how rapidly he/she should modify the steering direction.

Furthermore, it is advantageous to arrange the display elements in the region of an instrument panel of the vehicle since they are immediately visible to a driver in that location. It is particularly advantageous to arrange the display elements at the margin of a display unit since, for one, they are easy to install there and, secondly, they are easy to view as well. At the same time, a generally unused display region is able to be utilized.

Moreover, it is advantageous to provide the display elements in a dial of a pointer display or in a freely programmable display since this makes it possible to dispense with the installation of additional display elements. To allow the other required information to be indicated to the driver, a switchover unit between the display of a steering-wheel angle to be modified and other displays is advantageously provided, for instance a speed display or an engine-speed display.

Moreover, it is advantageous that the display elements are visible in the rear mirror, or that a driver who is turning back, for instance, can see them in the rear region of the vehicle, or that they are arranged there. This makes it possible to inform the driver, in particular in reverse driving which poses special demands on the driver due to the less than optimal visibility conditions encountered under these circumstances.

For easier driver orientation, the steering angle to be modified is represented in relation to a reference point, so that a driver is able to understand the change in the steering-wheel angle quite easily by comparing an illuminated display element and the reference point.

To improve the driver's orientation, the display elements may advantageously be controlled on the basis of different colors or different spatial arrangements as a function of an amount of a steering-wheel angle to be implemented, so that it is possible for a driver to understand the required change in the steering-wheel angle already from the position and/or the color of an illuminated display element. There is no need for the driver to first understand the meaning of a text display or a symbol.

In another specific embodiment, the display used to indicate the steering-wheel angle to be modified is utilized to indicate the length of a parking space as well. In this way, the driver is able to first check the size of the parking space, and then receive instructions, via the same display and preferably adapted to the dimensions of the parking space, on how to enter this parking space.

Furthermore, it is especially advantageous to refine a method for operating a display unit according to the present invention so that the change in the steering-wheel angle is determined from a precalculated travel path of the vehicle and displayed to the driver. Thus, both parking and automatic lane tracking in street traffic may be calculated and a route to be followed then output to the driver. Depending on the design, it may be indicated to the driver, either in addition or as an alternative, in which way to adjust the steering-wheel angle set, or in which way to absolutely adjust the steering wheel.

BRIEF DESCRIPTION OF THE DRAWINGS

The present invention will be described in greater detail with reference to the following drawings wherein:

FIG. 3 shows a first exemplary embodiment of a display unit according to the present invention.

FIGS. 4 to 9 show additional exemplary embodiments for display units according to the present invention.

DETAILED DESCRIPTION OF THE INVENTION

The display unit according to the invention may be used in a wide variety of motor vehicles. Especially advantageous is the use in motor vehicles where the visual orientation of the driver is normally sufficient for safe driving. However, assistance is required in special situations, so that, on the one hand, a display unit for indicating a steering-wheel angle to be modified should be easy to see for the driver, whereas, on the other hand, it should not distract him in case no assistance is required. The driver needs support in particular when the visibility conditions are less than optimal. The display unit according to the present invention may be used, for example, to inform the driver that the vehicle should be kept in a traffic lane ascertained by a vehicle-sensor system or calculated by a computer if the visibility is poor or obstructed. In a parking operation, for instance, it may be difficult for a driver to estimate the outer dimensions of the vehicle and to detect obstacles in the vicinity of the vehicle. Furthermore, to be able also to use parking spaces that are smaller but nevertheless of sufficient size for his or her vehicle, a driver may possibly have to drive closer to an obstacle than he would do under normal circumstances. In the following, the display unit of the present invention will therefore be described using a parking-assistance system as an example. A variety of arrangements in the vehicle is conceivable for a display unit according to the present invention. Hereinafter, the arrangement of a display unit according to the present invention in the visual field in front of the driver will be elucidated, in particular.

Figure 1:
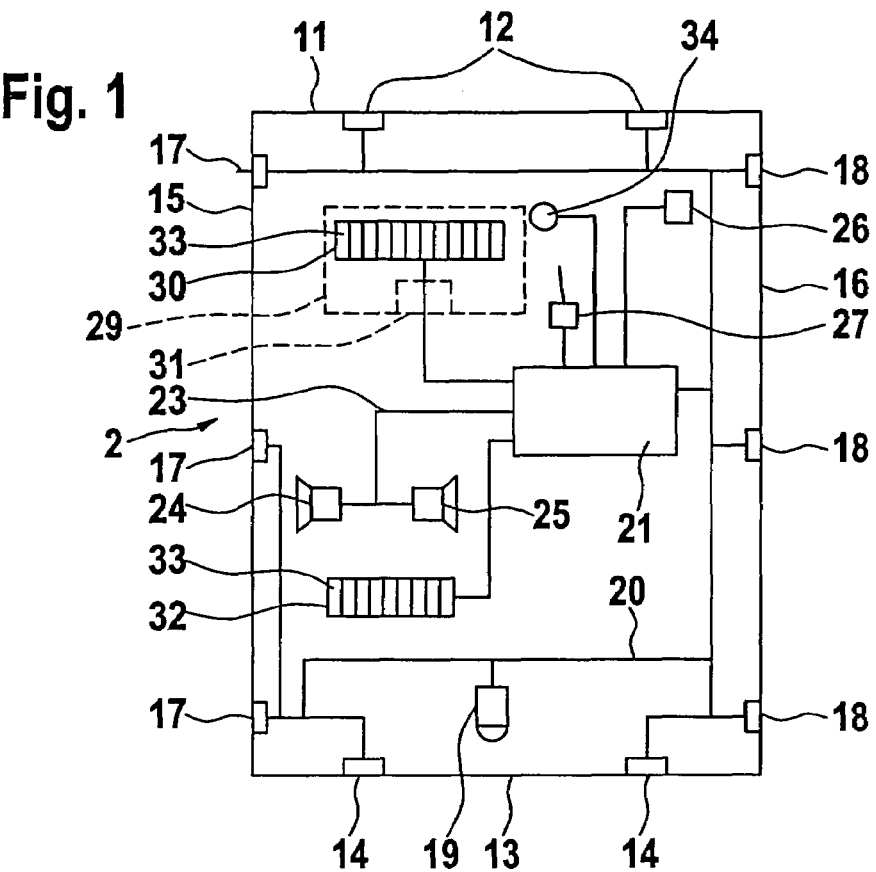
FIG. 1 shows a schematic representation of a motor vehicle having a display unit according to the present invention.

FIG. 1 schematically illustrates a vehicle 2 which has sensors for detecting the area around the vehicle. Sensors 12 for detecting the driving space in front of the vehicle are arranged on vehicle front 11. In the same manner, sensors 14 are arranged at vehicle rear 13 to monitor the space behind the vehicle. Sensors 12, 14 are provided to detect obstacles in front or behind the vehicle. Additionally arranged both on left vehicle side 15 and on right vehicle side 16 are sensors 17 and 18, respectively. On the one hand, the sensors detect obstacles to the side of the vehicle, so that a warning may be output for the driver, if required. On the other hand, however, sensors 17, 18 arranged to the side are provided to detect the size of a parking space as well, especially the length of parking spaces that extend along the side of the road, so that a decision may be made whether the parking space is suitable for parking vehicle 2. To this end, sensors 18 on the right vehicle side, for instance, measure the distance of vehicle 2 with respect to parked vehicles. If vehicle 2 drives past a parking space, the measured distance increases, so that the length of the parking space is able to be determined while the vehicle is passing it. To detect obstacles, sensors 12, 14, 17, 18 emit signal lobes that are as broad as possible and which preferably scan the entire vehicle environment. If obstacles are found in this environment, the signals are reflected and intercepted by the emitting sensor or some other sensor. The sensors are preferably embodied as ultrasonic sensors. However, electromagnetic waves are able to be emitted as well, so that the sensors operate as radar or lidar sensors. In another specific embodiment, it is also possible that a camera 19 is monitoring the vehicle environment.

The sensors are connected to a control unit 21 via a data bus 20. Control unit 21 analyzes the signals transmitted by sensors 12, 14, 17, 18 as well as the signals transmitted by camera 19, if installed, and in a first operating mode checks whether the vehicle is in danger of a collision if the distance to an obstacle in the vehicle environment has become too small. To warn the driver, control unit 21 is connectable to a multitude of output units. In a preferred embodiment, for example, an acoustical output 23 having a first loudspeaker 24 and a second loudspeaker 25 is connected to control unit 21. Loudspeakers 24, 25 are preferably mounted on the vehicle with directional assignment, so that a warning regarding an obstacle to the left of the vehicle is output via first loudspeaker 24 arranged to the left, and a warning regarding an obstacle on the right vehicle side is output via second loudspeaker 25 arranged to the right. This allows a spatial assignment of the vehicle to a vehicle direction by the driver. To be able to assign the sensor signals to points along the path of the travel route, control unit 21 is connected to a mileage recorder 26. Furthermore, control unit 21 is also connected to a detection unit 27 to determine a position of the transmission selector lever for the purpose of ascertaining whether the vehicle should drive forward or in reverse. If a forward gear is engaged, it must be assumed that the vehicle is to drive forward, so that the sensors at front end 11 are activated. When driving in reverse, the sensors arranged at vehicle rear 13 of the vehicle, in particular, are polled.

Figure 2:
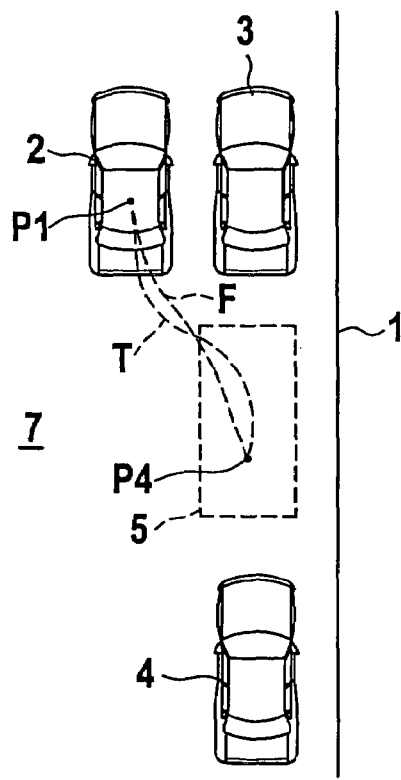
FIG. 2 shows a parking scenario of a vehicle in a parking space.

Apart from a pure distance measurement, control unit 21 is configured to determine a parking path of the vehicle into a parking space. The length and possibly also the width of the parking space are ascertained earlier, when vehicle 2 is passing the parking space, for instance via sensors 18 arranged on right vehicle side 16. While driving past, the position of the vehicle relative to the parking space is determined as well, via mileage recorder 26. Furthermore, the distance of vehicle 2 relative to parked vehicles is ascertained too, utilizing sensors 18. On the basis of these data, a control unit 21 calculates a parking trajectory that the vehicle is to follow based on a starting position. In the process the vehicle is guided in such a manner that a collision with the parked vehicles is avoided, and the vehicle is steered into the parking space without unnecessary maneuvering, if possible. A situation according to the present invention is illustrated in FIG. 2. Vehicle 2, schematically shown in FIG. 1, traveling on a road surface 7, has driven past a first parked vehicle 4 and past a parking space between first parked vehicle 4 and a second vehicle 3 parked along shoulder 1. In the process, sensors 18 have measured the distance between first parked vehicle 4 and second parked vehicle 3. Control unit 21 has determined that a parking space 5, into which vehicle 2 may drive, is available between the two parked vehicles 3, 4. The fact that a suitable parking space is available is communicated to the driver either via an acoustical output unit 23 or by way of a display unit. The driver then stops at position P1 indicated by the vehicle center. Control unit 21 thereupon outputs steering instructions for the vehicle driver. The output is implemented via a display unit 30, which is shown in FIG. 1 and hereinafter will be elucidated on the basis of FIGS. 3 through 9.

In one specific embodiment, display unit 30 is part of a larger display unit 29. If required, a switchover unit 31 is provided which switches through an image signal from control unit 21 to display unit 30 when display unit 30 is operated according to the present invention. In another specific embodiment, a display unit 32 which is visible to the driver in such a way that this display appears in his field of vision should he happen to turn back in order to monitor the parking path into parking space 5, is provided in the rear region of the vehicle either in addition or as an alternative. Display units 30, 32 have individual display elements 33, which are shown merely schematically in FIG. 1 and only one of which has been provided with a reference numeral. The display fields are able to be selectively illuminated, so that, via a selective illumination of a display field or a group of adjacent display fields, the driver is given information as to how far and in what direction he is to turn the steering wheel of the vehicle in order to be able to follow the most comfortable parking trajectory F for parking in parking space 5. In the extreme case, even a parking trajectory T would be possible, which requires the steering wheel to be fully deflected, however. It is preferred that the display unit guides the driver in such a manner that, if possible, a full deflection of the steering wheel will not be required. The vehicle is preferably guided until it comes to a standstill in ideal parking position P4.

FIG. 3 shows a first exemplary embodiment of a display unit 40 according to the present invention. Display unit 40 is integrated at an edge 41 of an instrument panel arranged in front of the driver. Display unit 40 thus is located between windshield 42 and a display instrument 43, which is set into instrument panel 44. Display unit 40 is preferably arranged at a front edge of a cover that seals instrument panel 44 on the topside and thereby covers display instrument 43. Display instrument 43 is used to display additional important vehicle data such as the vehicle speed or the engine speed, pointer instruments 39 being arranged inside display instrument 43 for this purpose. In addition to display unit 40 according to the present invention, a variable display field 45 is provided inside of which a warning symbol 46 and/or directional arrows 47 is/are able to be displayed, which supplement or explain the display via display unit 40. If required, a corresponding display as in variable display field 45, may additionally point to an operation of display unit 40.

The method of functioning of display unit 40 will be discussed in the following. Display unit 40 is made up of individual indicator elements 48, which are arranged next to each other and of which only one has been provided with a reference numeral for reasons of clarity of the drawing. In a preferred specific embodiment, individual indicator elements 48 are configured as individually controllable, luminous fields or as individually illuminable fields. In a first embodiment, a light-emitting diode is arranged behind an associated cover window to this end. If necessary, the light-emitting diode also may be set directly into edge region 41 of instrument panel 44. Display unit 40 is controlled by the control unit (not shown in FIG. 3), which is preferably situated inside instrument panel 44.

In a first specific embodiment, the indicator elements are arranged as follows, the arrangement hereinafter being described from a left margin of display unit 40 to a right margin of the display unit. The individual display fields are arranged either directly adjacent to each other or at least in close proximity to each other. On the left side, a first group 51 of five red luminous fields is arranged first, followed by a second group 52 of five yellow luminous fields to the right. In center position is a third group of luminous fields 53, which encompasses seven green luminous fields. To the right, this is followed by a fourth group 54 of five yellow luminous fields. Next on the right is another, fifth group 55 of five red luminous fields. The particular number is provided as a preferred specific embodiment, it being possible to provide more or also fewer luminous fields depending on the design. Instead of a described color assignment—green in the center, yellow and red toward the outside—all luminous fields also may be represented by one color.

In a first specific embodiment, display unit 40 according to the present invention is operated in such a way that control unit 21 determines a direction of the vehicle and a steering-wheel angle required in this direction, which the vehicle is to drive in order to be steered around an obstacle without a collision, for instance. This expected steering angle is compared to the steering angle determined via a steering-angle sensor 34. Control unit 21 ascertains the difference between the adjusted steering angle and the steering angle to be expected. This difference may then mean that the implemented steering direction must be modified to the left or to the right. The steering direction may also be maintained. If precisely the steering direction that the vehicle is to drive is given, a center display element 56 which is situated in the center in third group 53, will be operated. If a deviation to the left is required, a luminous field to the left of centric display element 56 is triggered, whereas a luminous field to the right of centrical element 56 is triggered if the steering-wheel angle has to be changed toward the right. In a first specific embodiment, the position of the individual luminous element that is triggered here depends on the distances of the vehicle to obstacles in the vehicle environment. A luminous element within third group 53 will be triggered if a change in the steering-wheel angle can actually be implemented, but the desired position will be reached even without modifying a steering-wheel angle. The driver is then able to readjust, but will not be required to do so. A triggering of one of the luminous elements within second or fourth group 52, 54 occurs only if a vehicle does drive around an obstacle without causing a collision and without a steering change, but a first safety distance to the obstacles is undershot in the process. This suggests a corresponding steering change to the driver. If a luminous element lights up within first or fifth group 51, 55, respectively, the display warns the driver that a collision will occur if no change is made in the further travel. Range limits are specified as a function of the measured obstacle data of the vehicle, specific steering angles of the steering wheel being assigned to the individual luminous elements, and a path curve of the vehicle is calculated for the individual assigned steering-wheel angle. Furthermore, it is detected whether the vehicle is driving around the obstacle at the safety distance, whether the safety distance is undershot or whether there is the danger of a collision. In another specific embodiment, beginning with center element 56, it is also possible to assign each luminous element to the left and right a fixed steering change of preferably 5 degrees. If a steering-angle change of 20 degrees to the left is required, for instance, a luminous element five fields to the left of center display element 56 will be activated.

The described colored illumination of the individual luminous elements is an option, but no actual requirement. It is also possible to trigger all fields by the same color. Instead of light diodes, incandescent lamps or other light sources may be used as well.

A driver-initiated correction is carried out in such a way that the driver turns the steering wheel to the left if an element within second group 52 is activated by luminous elements. Turning the steering wheel to the left causes the illumination of the element to shift. By assigning an element illumination to a rotational angle of the steering wheel, the illumination is gradually shifted by one field to the right according to the rotation. The driver will then be able to turn the steering wheel until center display element 56 is reached whereupon the driver may proceed to drive straight.

In another specific embodiment, it is not only a required correction direction but precisely the incorrect angle that is able to be indicated by operation of the luminous element. A correction is implemented by the driver turning the steering wheel in the opposite direction until center display element 56 is reached or, at the least, one of the luminous elements within third group 53. If, for instance, a luminous element of fourth group 54 is triggered, the driver should turn the steering wheel to the left in this operating mode until the illuminated indicator mark has reached the center luminous element or one of the luminous elements within third group 53.

The steering suggestion is preferably provided for a stationary vehicle or, at the very least, for a slow-moving vehicle. If the vehicle is moving too fast, a warning that he is moving too fast for a steering correction will be output to the driver via variable display field 45 or via acoustical output unit 23. In response, the driver can then brake the vehicle, enabling him to implement the correction in the correct manner.

In a preferred specific embodiment, only one of indicator elements 48 of display unit 40 is triggered in each case to display a steering-wheel correction. If necessary, it is also possible to activate both luminous fields when switching from one luminous field to the next luminous field. In another specific embodiment, a group of luminous fields will be triggered for better visibility, such as always three to four luminous fields which travel across the scale formed by the adjacent luminous fields according to a movement of individual luminous fields.

In a further specific embodiment, prior to the start of a parking operation, display unit 40 will indicate to the driver whether parking is just barely possible or whether parking may be rather problematic. If a driver attempts to park in a parking space that is relatively large compared to his own vehicle, all available light diodes are utilized to provide the required steering movement. In contrast, if a driver tries to park in a relatively small parking space, the fact that the parking space is small is visually indicated to the operator by a reduced number of activated luminous fields.

The reasoning here is that parking in a small parking space requires considerably more sensitive steering movements since the available travel route envelope is much smaller due to the fact that an ideal trajectory for parking allows only much fewer deviations. If a large parking space is involved, the entire display range of five red, five yellow and seven green luminous fields may be activated. If the parking space is smaller, only three red, three yellow and five green luminous fields are triggered, the luminous fields situated in between being left out. In a light movement of the steering wheel relative to a large parking space, the activated luminous field thus travels much faster across display unit 40. In a smaller parking space, only one red, one yellow and three green luminous fields are activated. If the parking space is in the borderline range and only a very small trajectory is possible, the driver will have to follow the ideal line. Consequently, only one red and, in the center, one green light-emitting diode 53 will be activated when the driver is located on the ideal line. If the parking space is too small, the red light-emitting diodes at the edge may blink, for instance, thereby signaling to the driver that parking is impossible.

In the course of the parking operation, the parking trajectory is preferably updated and recalculated by the control unit in a continuous manner, so that an adaptation to changed obstacles, for example a backward or forward movement of first vehicle 4 parked in the rear, is able to be taken into account when calculating the parking trajectory.

In a preferred specific embodiment, the optical display is supplemented by an acoustical display or by acoustic warnings via acoustical output unit 23.

FIG. 4 shows another specific embodiment, in addition or as an alternative, in which a display unit 60 according to the present invention is mounted in a rear window 61 of the vehicle. If the driver backs up, gear-shift lever detector 27 detects the engagement of a reverse gear. The driver will then either turn around in order to be able to monitor the space in the rear through rear window 61, or he or she will look in the rearview mirror so as to monitor rear window 61 via a glance into the rearview mirror. In any event, the driver's eyes are generally not focused on display instrument 43 or an indicator unit arranged there. To ensure that the driver receives information about the steering direction in an optimal manner in this case as well, display unit 60 includes indicator fields 62 which are likewise arranged next to each other and triggered in the manner according to the present invention for the display of a change in the steering direction. In a preferred specific embodiment, display unit 60 is arranged on the inside vehicle roof or at an edge of rear window 61. While the driver is able to monitor the rear driving space, for example first parked vehicle 4, display unit 60 is in his visual field at the same time. In a first specific embodiment, display unit 60 is implemented on instrument panel 44, analogously to display unit 40. In another specific embodiment, however, the number of luminous fields in display unit 60 may also be lower so as to keep the required installation space as small as possible.

FIG. 5 shows another exemplary embodiment of a display unit 70 according to the present invention. In this case, display unit 70 is integrated in a display instrument 71. In a first specific embodiment, luminous fields, which are individually triggerable for backlighting with the aid of appropriate light sources, are set into a dial surface 72 of indicator instrument 71 for this purpose. Arranged adjacent to display unit 70 on the indicator instrument are indicator instruments 73. In the specific embodiment illustrated here, display unit 70 is arranged in an upper edge region of indicator instrument 71. However, in a design not shown in the drawing, it is also possible for display unit 70 to be located in a lower edge region of indicator instrument 71. A preferred embodiment of a display unit according to the present invention is elucidated with the aid of the specific embodiment shown in FIG. 5. A centrical indicator field 74 has been highlighted by marking 75 in FIG. 5. Centrical indicator field 74 is used as reference point that indicates an ideal steering direction. If a luminous field outside the center is activated, a driver is able to orient himself on the basis of the difference between the activated luminous field and centrical indicator field 74, to thus read out to what degree a steering direction must be modified. To this end, centrical indicator field 74 is preferably highlighted by a marking 75. In another specific embodiment, centrical indicator field 74 also may be illuminated at all times, so that both centrical indicator field 74 and the reference point are visible to a driver.

In another specific embodiment it is not the relative change of a steering direction that is displayed by display unit 70, but the absolute steering direction as well as a suggested steering-wheel angle, so that a first field of the display unit is operated using a first color, for instance to indicate the instantaneous steering-wheel angle, while a second field is operated using a second color to represent a contrasting desired steering-wheel angle. The outermost left indicator field 76 is used to illustrate a complete turning-in to the left, whereas the outermost right indicator field 77 is used to illustrate a complete turning-in to the right. On the one hand, the driver is therefore provided with an absolute indication of the steering-wheel angle to be implemented, while, on the other hand, he also receives information regarding a steering-wheel angle to be modified from the difference between the steering angle set and the steering angle to be implemented.

FIG. 6 shows an additional exemplary embodiment in this context in which, in a display unit 80 according to the present invention which is integrated in an indicator instrument 79, an instantaneous steering angle is displayed in a first dial 81, while a steering angle to be set is illustrated adjacent thereto, in a second dial 82. By turning the steering wheel, the driver is then able to make the marking in second dial 82 coincide with the marking in first dial 81 so as to be able to follow the calculated driving path.

FIG. 7 shows another exemplary embodiment of a display unit according to the present invention. The display is made in a display instrument 90, which has a dial display 91 that includes illuminable dial segments 92. In addition to dial segments 92, the specific embodiment illustrated here shows dial markings 93 to display a speed value, the speed being indicated by a pointer 94 which is controlled via a drive (not shown). In addition to the illustrated speed display, other indicator displays 95 and symbol-field displays 96 may be integrated in display instrument 90 as well and be visible to a driver while he is steering the vehicle. In a first operating mode according to the present invention, dial segments 92 are used to represent a modified steering-wheel angle. The function of the individual dial segments corresponds to the meaning of indicator elements 48 or 62, and 76, 77 according to FIGS. 3 through 5. Dial segments 92 are therefore able to be utilized not only to indicate the speed and to provide a cruise-control display, if applicable, but also to display information to the driver for parking in a parking space. This exploits the fact that a driver generally moves at a relatively low speed when parking, so that speed information is usually irrelevant to him. In a preferred specific embodiment, indicator 94 is therefore moved out of the driver's visual field during a parking operation or moved to the edge of the dial. Analogously to the triggering of the individual luminous fields as discussed in connection with FIGS. 3 through 5, one of the number segments in the dial is activated. A speed value of 0 km/h corresponds to an outermost left edge, or a steering instruction heavily to the left, while a dial value at the dial end at 200 km/h corresponds to a steering angle to the right. In support operation for parking, unchanged steering is represented by a corresponding instruction symbol, which may be operated optionally and constitutes a reference point 97 for the driver. In an analogous manner, a representation of the required steering correction may also be accomplished by a dial mark, which is placed on the dial using an appropriate color. In a preferred specific embodiment, the speed values may be made to disappear during a parking operation by omitting their backlighting.

According to FIG. 1, a switchover unit 31 in display instrument 90 is provided for the switchover from speed operation to support in a parking operation, the switchover unit shifting between displaying the speed value and outputting a steering modification to be implemented. A speed limit of 5 km/h, for instance, is preferably provided above which an automatic switch back to the speed display will take place. For the support to be activated, the speed of 5 km/h should be exceeded for at least three seconds or, for instance, by at least 5 km/h, depending on whatever occurs first. The support will also be deactivated if the indicated differential steering angle is not compensated by the driver or is not compensated in a timely manner. In this case, the display turns off and a warning sound will preferably be emitted via acoustical output unit 23.

Instead of the speedometer, the display of the tachometer or another pointer display may be used to represent a steering angle to be modified in display instrument 90. Furthermore, the display of a preselected speed for following a preceding vehicle at a regulated speed may be used to this end as well since it may be utilized for both purposes due to the fact that parking and following a preceding vehicle at a regulated speed may not be used simultaneously. A matrix display within display instrument 90 provided for this purpose may be utilized for the output. In a first specific embodiment, display instrument 90 is implemented by mechanically realized pointer displays. In another specific embodiment, display instrument 90 may also be represented as a matrix display overall, dial segments 92 as well as pointer 94 and scale marking 93 being calculated only for the display on a screen of a display and being shown on this screen. A corresponding display of the dial segments will then likewise be implemented by calculating a corresponding display image.

Another exemplary embodiment for a display is shown in a freely programmable cluster element 100 in which a freely programmable image representation of displays and measuring results is implemented in a variable display of adequate size, for instance a liquid crystal display. A light spot 101 for indicating a steering angle to be corrected moves along a dial 102 on which further designations and markings such as speed values are blanked out. An appropriate symbol display 103 indicates to the driver that a parking operation has been triggered, while another symbol 104 makes him aware of the fact that he must implement a steering correction by himself. A reference point 105 is preferably arranged in such a way that the reference point is approximately congruent with a speed of 100 km/h. Instead of a display via an indicator element, reference point 97 may also be indicated by an imprint on a dial face.

A display on a dial instrument having a planar dial face, in particular, has been elucidated on the basis of FIGS. 7 and 8. However, indicator instruments essentially having a round or elliptical form and being enclosed by a corresponding housing are known as well. Analogously to an arrangement at the edge of a display instrument according to FIG. 1, a display unit according to the present invention also may be set into such an edge region of an indicator display surrounding a dial. In another specific embodiment, it is also possible to provide a pointer instrument separately, to display only a steering direction to be corrected in a display element in front of the driver.

Figure 9:
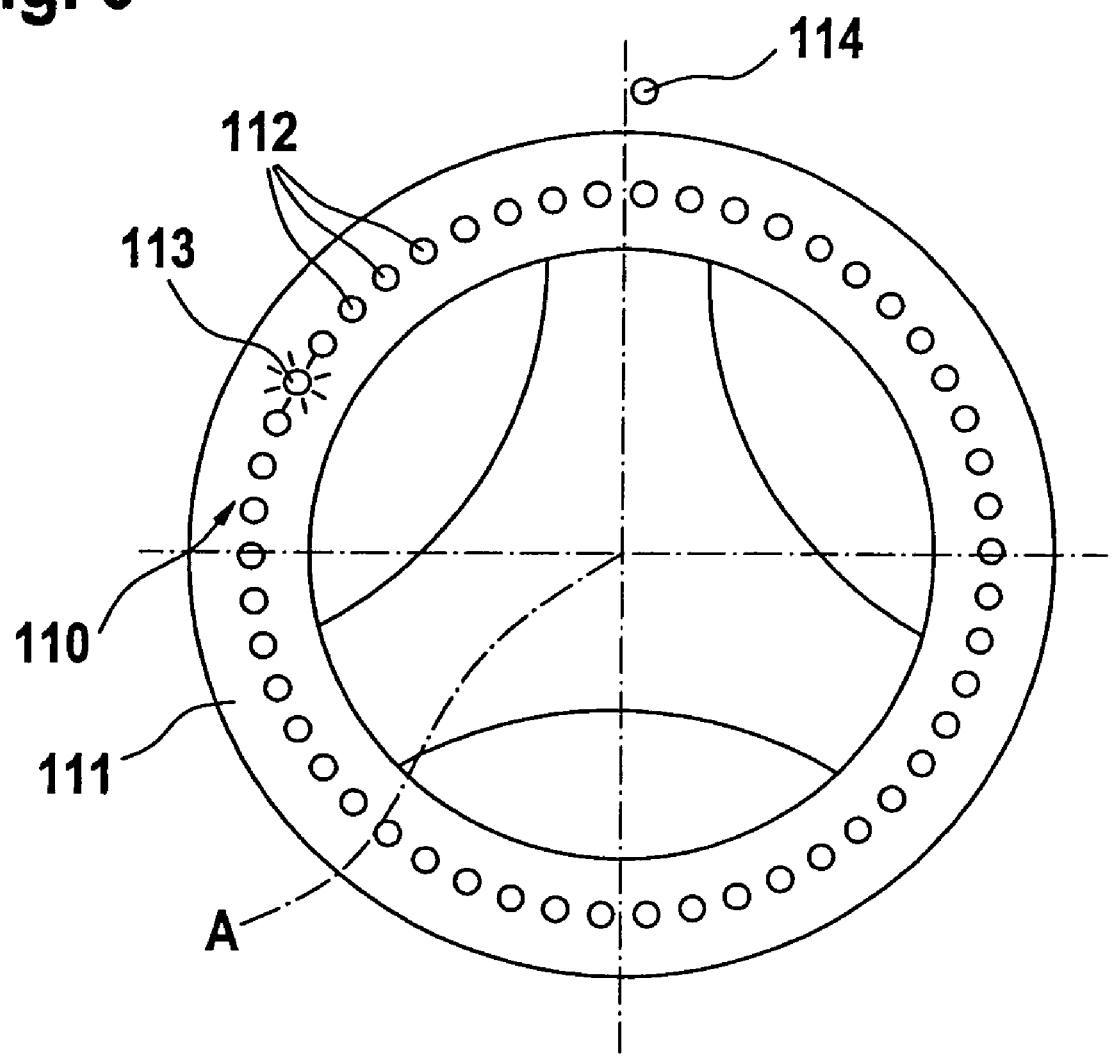

FIG. 9 shows another exemplary embodiment of a display unit 110 according to the present invention, which is integrated in a steering wheel 111 of the vehicle. Individual light spots 112 are arranged next to each other; a light spot—in this case, luminous element 113—is activated to display a steering change to be implemented. It will then fall to the driver to make luminous element 113 coincide with a reference point 114. In a preferred embodiment, reference point 114 may be the 12 o'clock position of steering wheel 111 which is rotated about axis of rotation A. However, in another specific embodiment, an additional illumination or marking of reference point 114 may be provided outside the steering wheel. Display 110 can be varied analogously to the display units elucidated with the aid of FIGS. 3 to 8. For instance, two dials may be arranged. Luminous elements 110 are preferably all arranged around the steering wheel. The elements are also preferably activatable in such a way that they are able to light up in different colors. Should the steering wheel be turned multiple times, this is indicated in a suitable manner, for instance by blinking of the particular luminous field. The driver then understands that he will be required not only to align the illuminated indicator element with the reference point, but must implement an additional turning of the steering wheel as well.

What is claimed is:
1. A display unit for displaying a steering-wheel angle, to be modified, of a vehicle, comprising:
   a plurality of indicator elements, which are arranged next to each other, wherein the display unit is arranged in a region of an instrument panel of the vehicle;
   display elements which are part of a dial of an indicator display or a freely programmable display; and
   a switchover unit for switching between a display of a steering wheel angle to be modified and a display function otherwise assigned to the dial or the freely programmable display.

2. The display unit according to claim 1, wherein the indicator elements are illuminable to display the steering-wheel angle to be modified.

3. The display unit according to claim 2, wherein illumination of particular indicator elements depends on a steering-wheel angle to be modified.

4. The display unit according to claim 2, wherein illuminated indicator elements are able to be illuminated in different colors as a function of the amount of a steering-wheel angle to be implemented.

5. The display unit according to claim 1, wherein the display unit is arranged at an edge of an indicator device for the output of additional information.

6. The display unit according to claim 5, wherein the indicator elements are illuminable to display the steering-wheel angle to be modified.

7. The display unit according to claim 5, wherein the display unit displays the length of a parking space.

8. The display unit according to claim 1, wherein the display unit displays the length of a parking space.

9. The display unit according to claim 1, wherein the display unit is arranged in the vehicle such that the indicator elements are visible in a rearview mirror or are visible to a driver if the driver turns in the direction of a rear window.

10. The display unit according to claim 1, wherein the steering angle to be modified is represented in relation to a reference point.

11. A method for displaying a steering-wheel angle, to be modified, of a vehicle, the displaying being via a display unit arranged in a region of an instrument panel of the vehicle and having (a) a plurality of indicator elements, which are arranged next to each other, (b) display elements which are part of a dial of an indicator display or a freely programmable display, and (c) a switchover unit, the method comprising:
    switching between a display of a steering wheel angle to be modified and a display function otherwise assigned to the dial or the freely programmable display using the switchover unit.

12. The method according to claim 11, wherein the indicator elements are illuminable to display the steering-wheel angle to be modified.

13. The method according to claim 11, wherein the modification of the steering-wheel angle is determined from a comparison of a currently set steering-wheel angle with a calculated driving path of the vehicle.

14. The method according to claim 13, wherein the calculated driving path is a driving path for parking the vehicle in a parking space.

15. The method according to claim 11, wherein a modification of the steering-wheel angle to be implemented is represented relative to a currently set steering-wheel angle.

16. The method according to claim 11, wherein a steering-wheel angle to be adjusted absolutely is illustrated.

17. The method according to claim 11, wherein the display unit is arranged at an edge of an indicator device for the output of additional information.

18. The method according to claim 11, further comprising: displaying the length of a parking space.

19. The display unit according to claim 6, wherein illumination of particular indicator elements depends on a steering-wheel angle to be modified.

* * * * *